US008749824B2

(12) United States Patent
Aoki et al.

(10) Patent No.: US 8,749,824 B2
(45) Date of Patent: Jun. 10, 2014

(54) IMAGE PROCESSING APPARATUS, METHOD AND NON-TRANSITORY COMPUTER READABLE MEDIUM USING VARIABLE SCREEN UPDATE POLLING INTERVAL

(75) Inventors: Takashi Aoki, Kanagawa (JP); Akihito Toyoda, Kanagawa (JP); Masaya Kaji, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 447 days.

(21) Appl. No.: 13/231,372

(22) Filed: Sep. 13, 2011

(65) Prior Publication Data

US 2012/0243036 A1    Sep. 27, 2012

(30) Foreign Application Priority Data

Mar. 24, 2011    (JP) .................................. 2011-066713

(51) Int. Cl.
    *G06F 3/12*    (2006.01)
(52) U.S. Cl.
    USPC ........... 358/1.15; 358/1.1; 709/230; 709/225; 709/250; 710/3; 710/9; 702/186
(58) Field of Classification Search
    None
    See application file for complete search history.

(56) References Cited

U.S. PATENT DOCUMENTS

| 6,453,268 B1 * | 9/2002 | Carney et al. ................. 702/186 |
| 8,392,923 B2 * | 3/2013 | Walters ......................... 718/102 |
| 2002/0140962 A1 | 10/2002 | Oka | |

FOREIGN PATENT DOCUMENTS

| JP | 2000-187563 A | 7/2000 |
| JP | 2002-297336 A | 10/2002 |
| JP | 2002-297462 | * 10/2002 |
| JP | 2008-077207 A | 4/2008 |
| JP | 2009-282950 A | 12/2009 |
| JP | 2010-198055 A | 9/2010 |

* cited by examiner

*Primary Examiner* — Paul F Payer
(74) *Attorney, Agent, or Firm* — Sughrue Mion, PLLC

(57) ABSTRACT

An image processing apparatus includes: a receiving unit that receives a screen update request including identification information of a screen and a job start request including identification information of a job; a database that defines a relationship between the identification information of the screen, the identification information of the job, and a polling interval corresponding to a degree of association between the screen and the job; a determining unit that determines the polling interval corresponding to the degree of association between the screen and the job on the basis of the identification information of the screen and the identification information of the job received by the receiving unit and the database; and a transmitting unit that incorporates information of the determined polling interval into screen data and transmits the incorporated screen data to an external apparatus that outputs the screen update request.

18 Claims, 21 Drawing Sheets

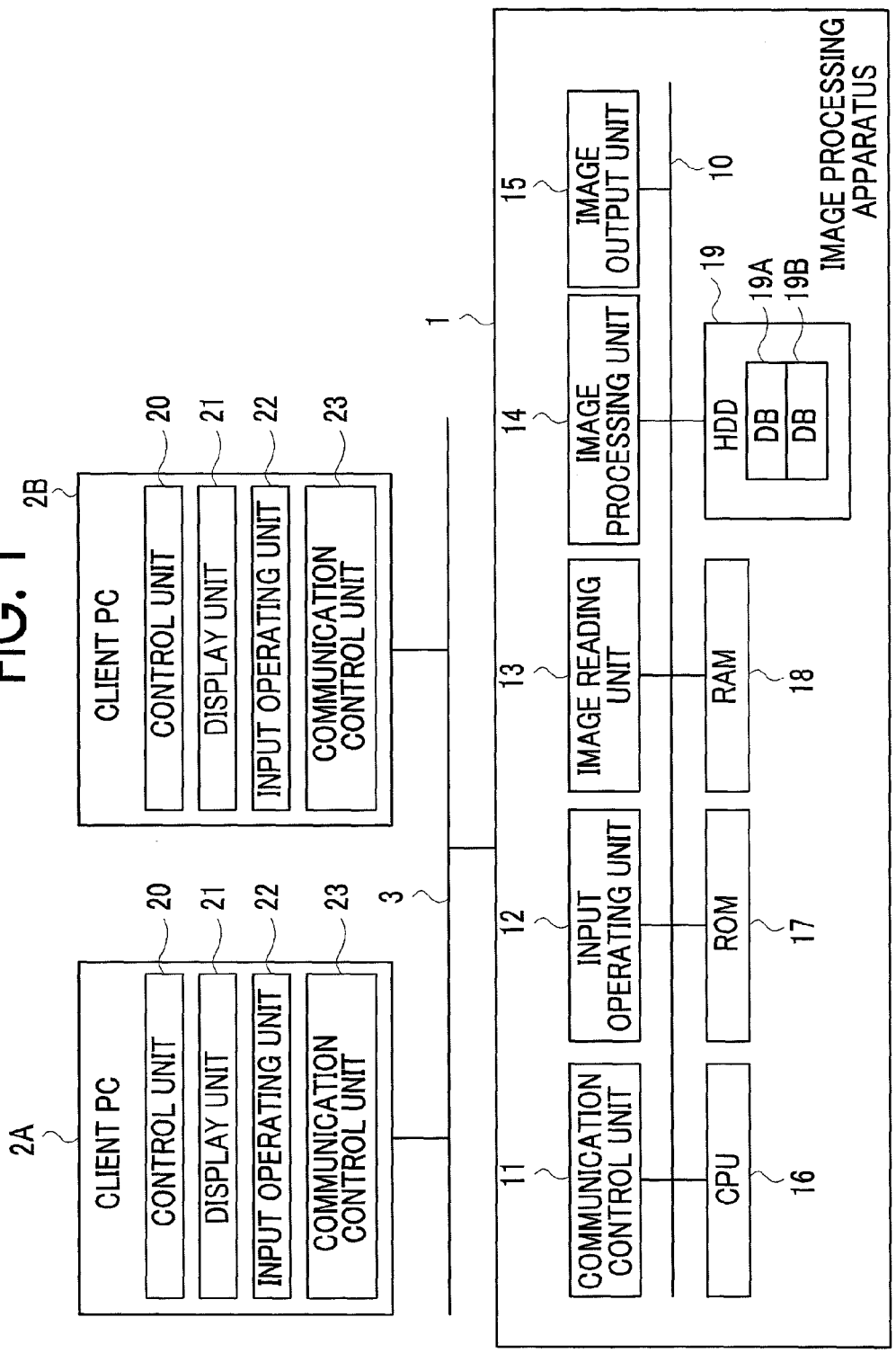

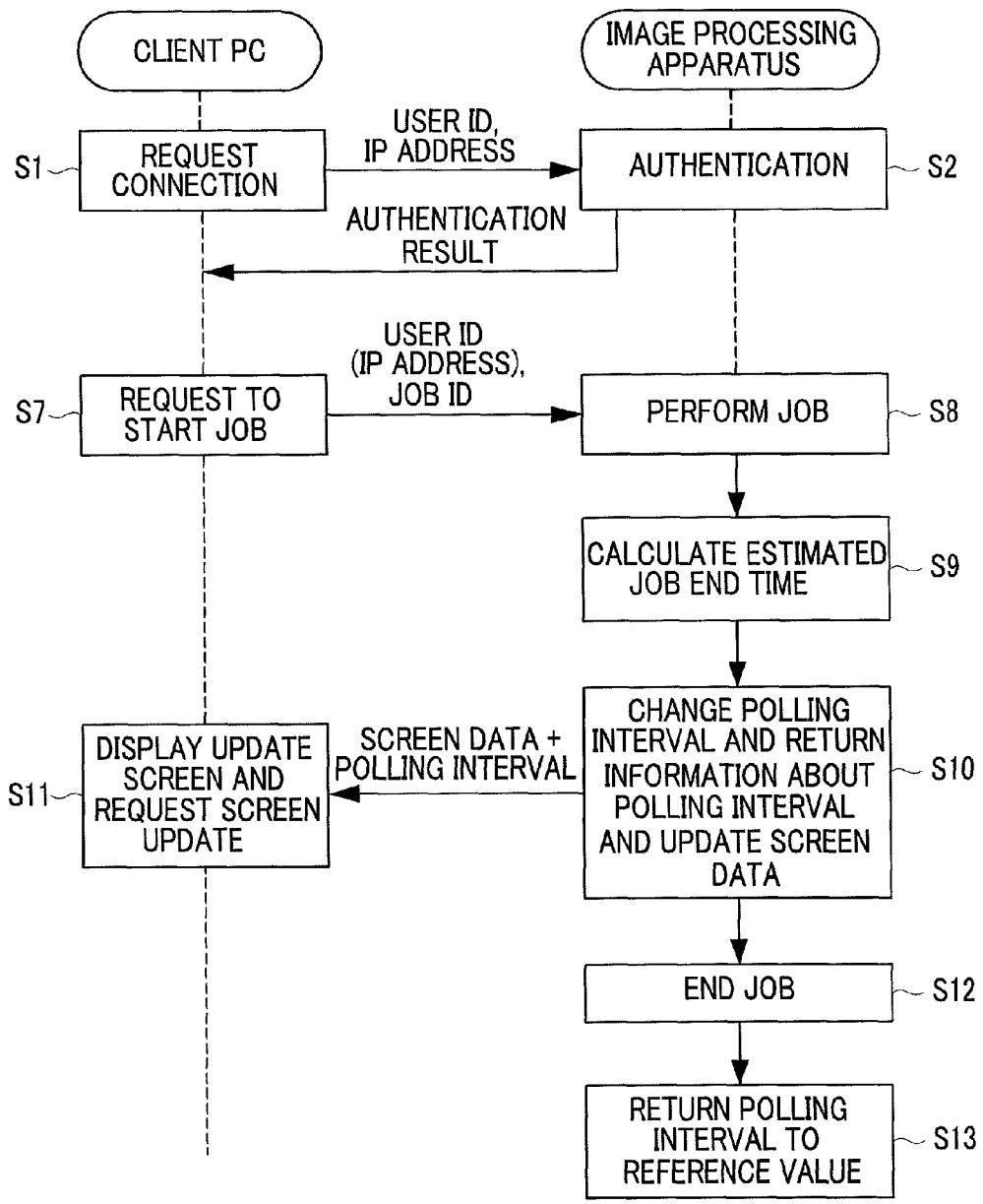

FIG. 3A

| ATTRIBUTE OF SCREEN | KIND OF SCREEN | SCREEN ID | POLLING INTERVAL |
|---|---|---|---|
| JOB STATUS/SETTING SCREEN | · JOB LIST<br>· JOB HISTORY LIST<br>· ERROR HISTORY INFORMATION<br>· JOB SETTING<br>FOR EXAMPLE | A001<br>A002<br>A003<br>A004 | LESS THAN REFERENCE VALUE |
| SCREEN INDIRECTLY RELATED TO JOB | · APPARATUS STATUS INFORMATION<br>· SUPPLY STATUS INFORMATION<br>· TRAY STATUS INFORMATION<br>· COUNTER INFORMATION<br>· DOCUMENT LIST OF CONFIDENTIAL BOX<br>FOR EXAMPLE | B001<br>B002<br>B003<br>B004<br>B005 | LESS THAN REFERENCE VALUE ACCORDING TO DEGREE OF ASSOCIATION BETWEEN JOB AND SCREEN |
| SCREEN THAT IS NOT RELATED TO JOB | · SUPPORT SCREEN<br>· HELP SCREEN<br>FOR EXAMPLE | C001<br>C002 | MORE THAN REFERENCE VALUE |

FIG. 3B

| KIND OF JOB (JOB ID) | JOB STATUS/ SETTING SCREEN | SCREEN INDIRECTLY RELATED TO JOB | | | SCREEN THAT IS NOT RELATED TO JOB |
|---|---|---|---|---|---|
| | JOB LIST SCREEN (SCREEN ID : A001) | SUPPLY STATUS INFORMATION SCREEN (SCREEN ID : B002) | COUNTER INFORMATION SCREEN (SCREEN ID : B004) | CONFIDENTIAL BOX DOCUMENT LIST SCREEN (SCREEN ID : B005) | SUPPORT SCREEN (SCREEN ID : C001) |
| NO JOB (J001) | 120 SECONDS (REFERENCE VALUE) | 120 SECONDS | 120 SECONDS | 120 SECONDS | 120 SECONDS |
| SCAN TO FAX (J002) | 10 SECONDS | 100 SECONDS | 30 SECONDS | 100 SECONDS | 180 SECONDS |
| SCAN TO CONFIDENTIAL BOX (J003) | 10 SECONDS | 100 SECONDS | 30 SECONDS | 10 SECONDS | 180 SECONDS |
| FAX TO PRINT (J004) | 10 SECONDS | 30 SECONDS | 30 SECONDS | 100 SECONDS | 180 SECONDS |
| COPY (J005) | 10 SECONDS | 30 SECONDS | 30 SECONDS | 100 SECONDS | 180 SECONDS |

| STATUS | JOB | PRINT | SCAN | ... | SUPPORT |

| STATUS |
|---|
| GENERAL |
| TRAY |
| SUPPLIES |
| ... |

SUPPLIES

TONER
| COMPONENT | STATUS |
|---|---|
| BLACK TONER | GOOD 100% |

DRUM
| COMPONENT | STATUS |
|---|---|
| BLACK DRUM CARTRIDGE | GOOD |

STAPLER CARTRIDGE
| COMPONENT | STATUS |
|---|---|
| STAPLER CARTRIDGE | GOOD |

... ... ...

[ DISPLAY UPDATE ]

FIG. 4B

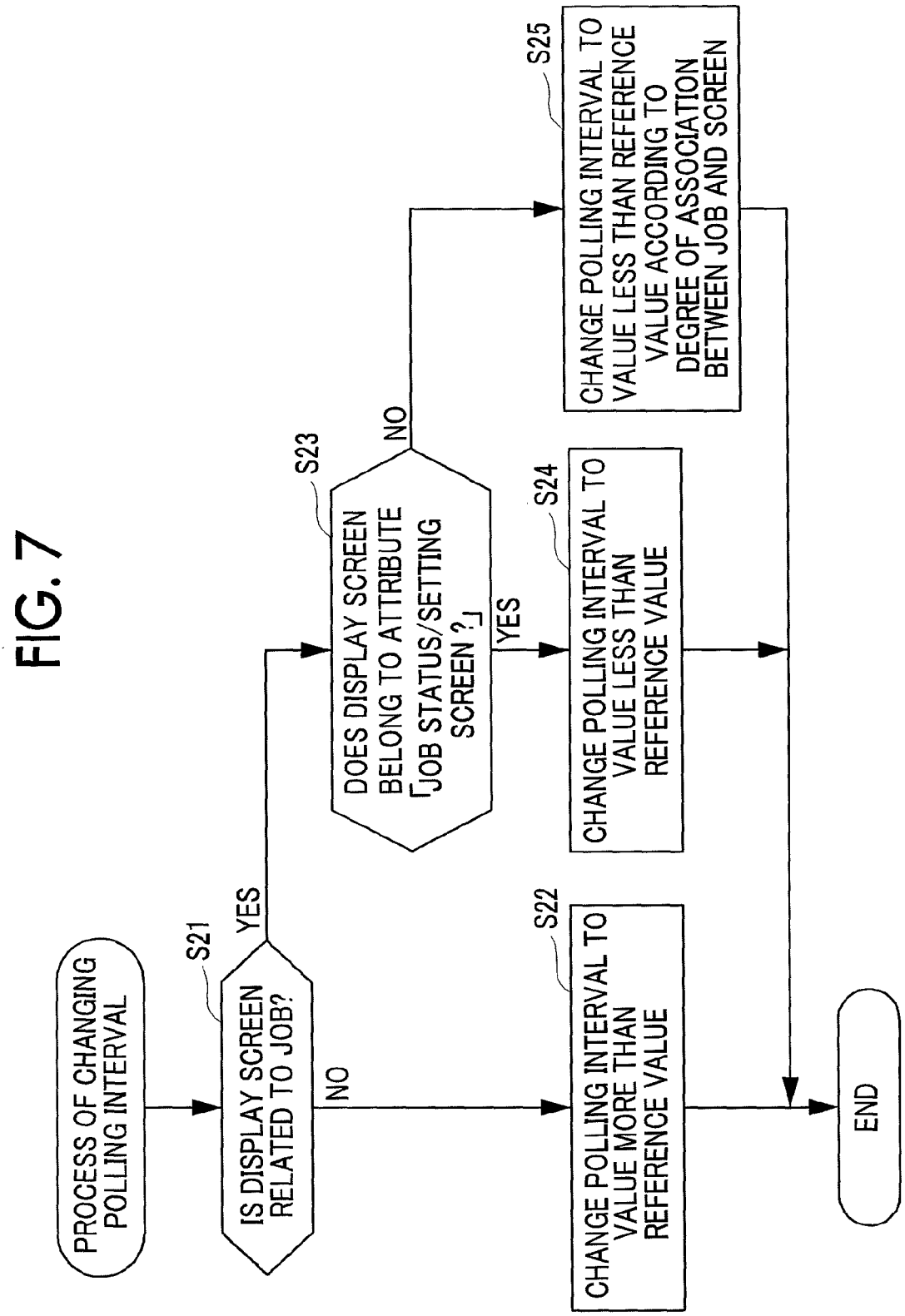

FIG. 8

| ATTRIBUTE OF SCREEN | KIND OF SCREEN | SCREEN ID | PERSON WHO REQUESTS JOB | POLLING INTERVAL |
|---|---|---|---|---|
| JOB STATUS/SETTING SCREEN | · JOB LIST<br>· JOB HISTORY LIST<br>· ERROR HISTORY INFORMATION<br>· JOB SETTING<br><br>FOR EXAMPLE | A001<br>A002<br>A003<br>A004 | USER<br>ANOTHER USER<br> | LESS THAN REFERENCE VALUE<br>MORE THAN REFERENCE VALUE |
| SCREEN INDIRECTLY RELATED TO JOB | · APPARATUS STATUS INFORMATION<br>· SUPPLY STATUS INFORMATION<br>· TRAY STATUS INFORMATION<br>· COUNTER INFORMATION<br>· DOCUMENT LIST OF CONFIDENTIAL BOX<br><br>FOR EXAMPLE | B001<br>B002<br>B003<br>B004<br>B005 | USER<br>ANOTHER USER | DETERMINE ACCORDING TO DEGREE OF ASSOCIATION BETWEEN JOB AND SCREEN |
| SCREEN THAT IS NOT RELATED TO JOB | · SUPPORT SCREEN<br>· HELP SCREEN<br><br>FOR EXAMPLE | C001<br>C002 | — | MORE THAN REFERENCE VALUE |

FIG. 9A

| KIND OF JOB (JOB ID) | JOB STATUS/ SETTING SCREEN | SCREEN INDIRECTLY RELATED TO JOB | | | SCREEN THAT IS NOT RELATED TO JOB |
|---|---|---|---|---|---|
| | JOB LIST SCREEN (SCREEN ID : A001) | SUPPLY STATUS INFORMATION SCREEN (SCREEN ID : B002) | COUNTER INFORMATION SCREEN (SCREEN ID : B004) | CONFIDENTIAL BOX DOCUMENT LIST SCREEN (SCREEN ID : B005) | SUPPORT SCREEN (SCREEN ID : C001) |
| NO JOB (J001) | 120 SECONDS | 120 SECONDS | 120 SECONDS | 120 SECONDS | 120 SECONDS |
| SCAN TO FAX (J002) | 10 SECONDS | STOP UNTIL ESTIMATED JOB END TIME | 30 SECONDS | STOP UNTIL ESTIMATED JOB END TIME | STOP UNTIL ESTIMATED JOB END TIME |
| SCAN TO CONFIDENTIAL BOX (J003) | 10 SECONDS | STOP UNTIL ESTIMATED JOB END TIME | 30 SECONDS | 10 SECONDS | STOP UNTIL ESTIMATED JOB END TIME |
| FAX TO PRINT (J004) | 10 SECONDS | 30 SECONDS | 30 SECONDS | STOP UNTIL ESTIMATED JOB END TIME | STOP UNTIL ESTIMATED JOB END TIME |
| COPY (J005) | 10 SECONDS | 30 SECONDS | 30 SECONDS | STOP UNTIL ESTIMATED JOB END TIME | STOP UNTIL ESTIMATED JOB END TIME |

FIG. 9B

| KIND OF JOB (JOB ID) | JOB STATUS/ SETTING SCREEN | SCREEN INDIRECTLY RELATED TO JOB | | | SCREEN THAT IS NOT RELATED TO JOB |
|---|---|---|---|---|---|
| | JOB LIST SCREEN (SCREEN ID : A001) | SUPPLY STATUS INFORMATION SCREEN (SCREEN ID : B002) | COUNTER INFORMATION SCREEN (SCREEN ID : B004) | CONFIDENTIAL BOX DOCUMENT LIST SCREEN (SCREEN ID : B005) | SUPPORT SCREEN (SCREEN ID : C001) |
| NO JOB (J001) | 120 SECONDS | 120 SECONDS | 120 SECONDS | 120 SECONDS | 120 SECONDS |
| SCAN TO FAX (J002) | STOP UNTIL ESTIMATED JOB END TIME | STOP UNTIL ESTIMATED JOB END TIME | 120 SECONDS | STOP UNTIL ESTIMATED JOB END TIME | STOP UNTIL ESTIMATED JOB END TIME |
| SCAN TO CONFIDENTIAL BOX (J003) | STOP UNTIL ESTIMATED JOB END TIME | STOP UNTIL ESTIMATED JOB END TIME | 120 SECONDS | 10 SECONDS | STOP UNTIL ESTIMATED JOB END TIME |
| FAX TO PRINT (J004) | STOP UNTIL ESTIMATED JOB END TIME | 120 SECONDS | 120 SECONDS | STOP UNTIL ESTIMATED JOB END TIME | STOP UNTIL ESTIMATED JOB END TIME |
| COPY (J005) | STOP UNTIL ESTIMATED JOB END TIME | 120 SECONDS | 120 SECONDS | STOP UNTIL ESTIMATED JOB END TIME | STOP UNTIL ESTIMATED JOB END TIME |

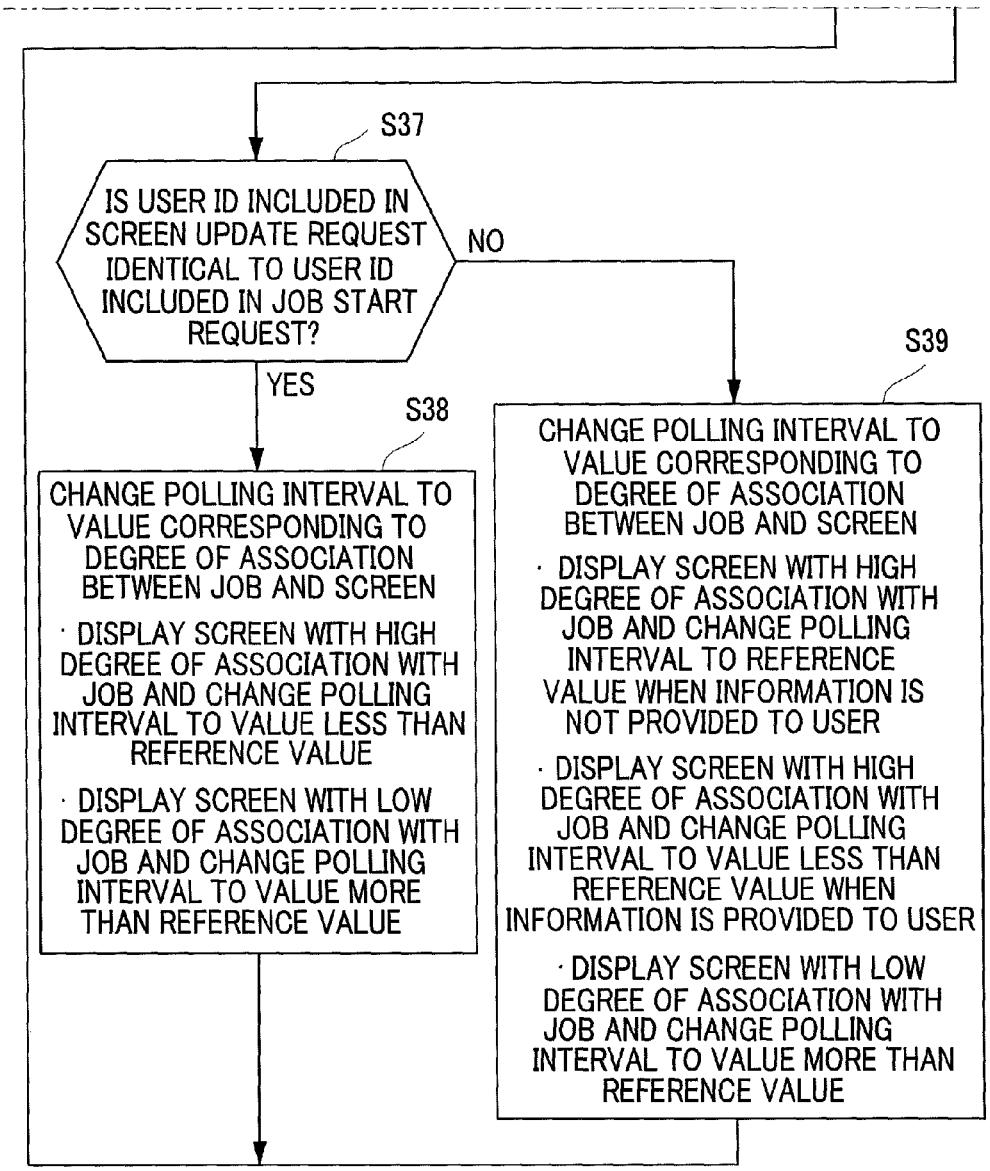

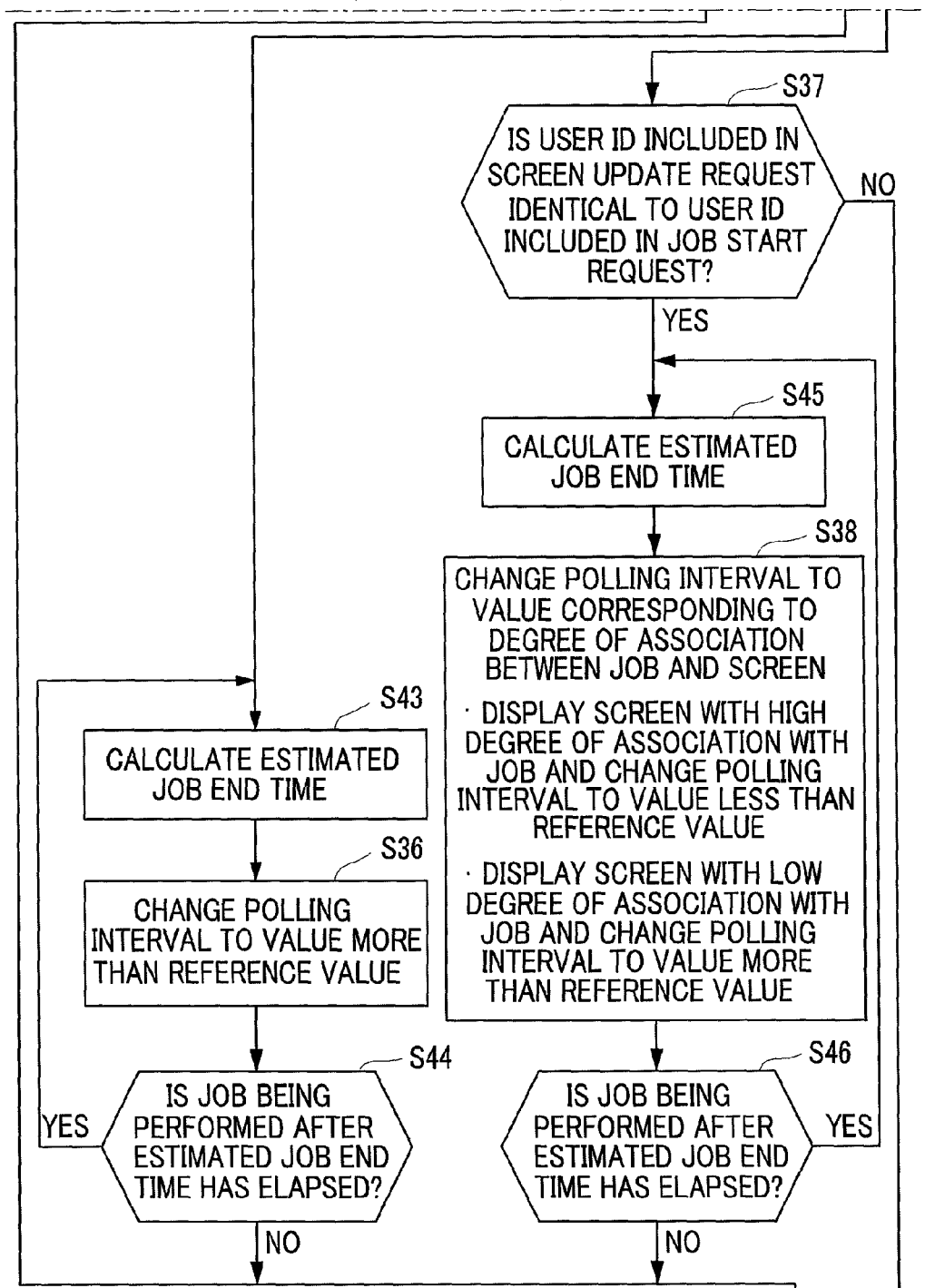

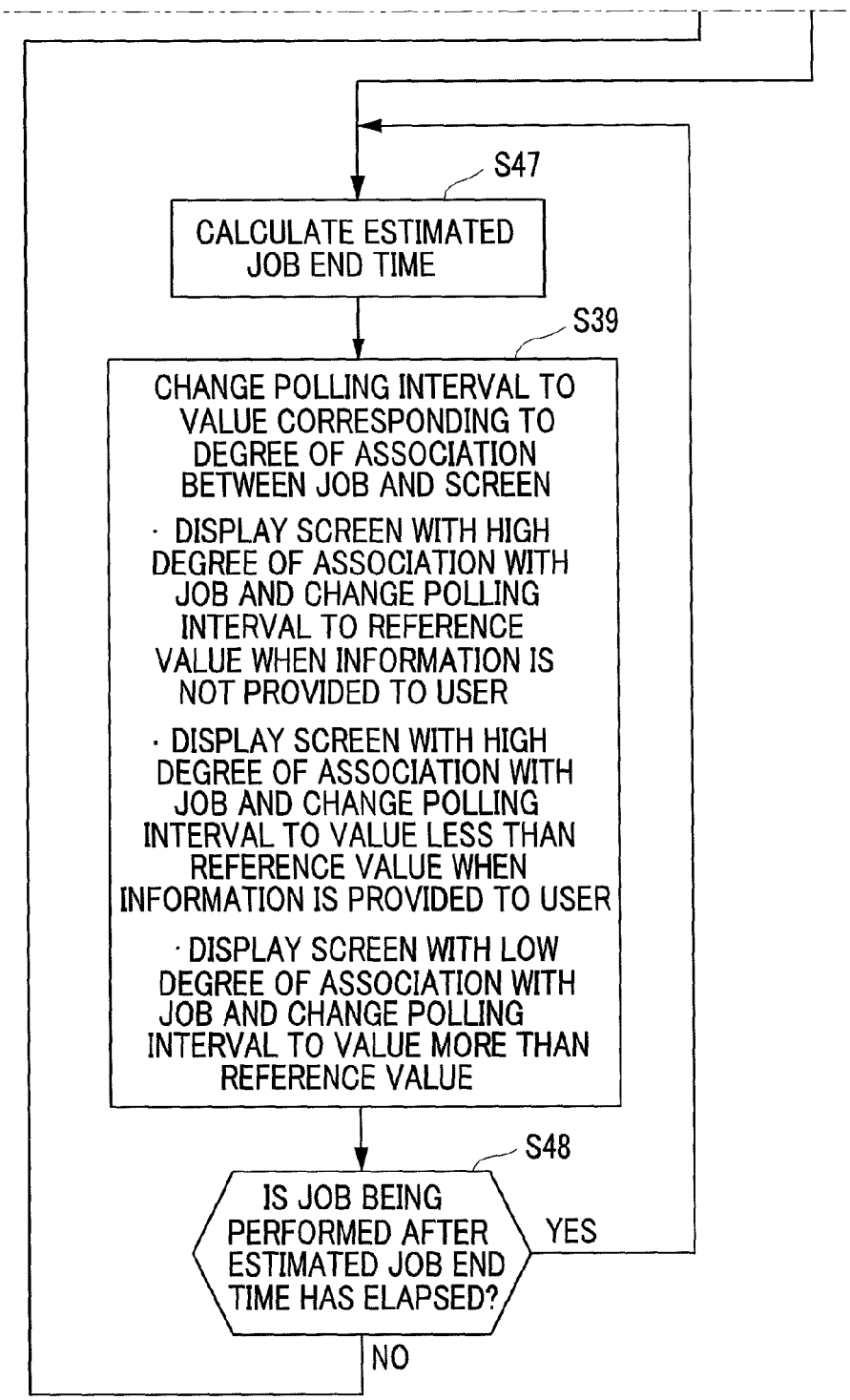
(FIG. 11 Continued)

FIG. 12

| KIND OF JOB (JOB ID) | JOB STATUS/ SETTING SCREEN | SCREEN INDIRECTLY RELATED TO JOB | | | SCREEN THAT IS NOT RELATED TO JOB |
|---|---|---|---|---|---|
| | JOB LIST SCREEN (SCREEN ID : A001) | SUPPLY STATUS INFORMATION SCREEN (SCREEN ID : B002) | COUNTER INFORMATION SCREEN (SCREEN ID : B004) | CONFIDENTIAL BOX DOCUMENT LIST SCREEN (SCREEN ID : B005) | SUPPORT SCREEN (SCREEN ID : C001) |
| NO JOB (J001) | 120 SECONDS | 120 SECONDS | 120 SECONDS | 120 SECONDS | 120 SECONDS |
| SCAN TO FAX (J002) | 10 SECONDS | STOP UNTIL ESTIMATED JOB END TIME | 30 SECONDS | STOP UNTIL ESTIMATED JOB END TIME | STOP UNTIL ESTIMATED JOB END TIME |
| SCAN TO CONFIDENTIAL BOX (J003) | 10 SECONDS | STOP UNTIL ESTIMATED JOB END TIME | 30 SECONDS | 10 SECONDS | STOP UNTIL ESTIMATED JOB END TIME |
| FAX TO PRINT (J004) | (ESTIMATED JOB END TIME/NUMBER OF PRINTOUTS/2)+ 1 SECOND | (ESTIMATED JOB END TIME/NUMBER OF PRINTOUTS/2)+ 1 SECOND | (ESTIMATED JOB END TIME/NUMBER OF PRINTOUTS/2)+ 1 SECOND | STOP UNTIL ESTIMATED JOB END TIME | STOP UNTIL ESTIMATED JOB END TIME |
| COPY (J005) | (ESTIMATED JOB END TIME/NUMBER OF PRINTOUTS/2)+ 1 SECOND | (ESTIMATED JOB END TIME/NUMBER OF PRINTOUTS/2)+ 1 SECOND | (ESTIMATED JOB END TIME/NUMBER OF PRINTOUTS/2)+ 1 SECOND | STOP UNTIL ESTIMATED JOB END TIME | STOP UNTIL ESTIMATED JOB END TIME |

Image Processing Apparatus, Method and Non-Transitory Computer Readable Medium Using Variable Screen Update Polling Interval

CROSS-REFERENCE TO RELATED APPLICATIONS

This application is based on and claims priority under 35 USC 119 from Japanese Patent Application No. 2011-066713 filed Mar. 24, 2011.

BACKGROUND (i) Technical Field

The present invention relates to an image processing apparatus, an image processing method, and a non-transitory computer readable medium storing a program.

(ii) Related Art

A technique has been known in which a computer that requests an image processing apparatus connected to a network to perform printing recognizes the execution status of printing or the status of the image processing apparatus.

SUMMARY

According to an aspect of the invention there is provided an image processing apparatus including: a receiving unit that receives a screen update request including identification information of a screen and a job start request including identification information of a job; a database that defines a relationship between the identification information of the screen, the identification information of the job, and a polling interval corresponding to a degree of association between the screen and the job; a determining unit that determines the polling interval corresponding to the degree of association between the screen and the job on the basis of the identification information of the screen and the identification information of the job received by the receiving unit and the database; and a transmitting unit that incorporates information of the determined polling interval into screen data and transmits the incorporated screen data to an external apparatus that outputs the screen update request.

BRIEF DESCRIPTION OF THE DRAWINGS

Exemplary embodiments of the present invention will be described in detail based on the following figures, wherein:

FIG. 1 is a block diagram illustrating the structure of a system including an external apparatus and an image processing apparatus according to a first exemplary embodiment;

FIG. 2B is a sequence diagram illustrating a process related to the execution of a job;

FIGS. 3A and 3B are diagrams illustrating an example of a polling interval determining database stored in an HDD 19;

FIG. 4B is a diagram illustrating an example of a supply status information screen;

FIG. 7 is a flowchart illustrating the details of a process (Step S10 in FIG. 2B) of changing a polling interval while an image processing apparatus performs a job;

FIG. 8 is a diagram illustrating an example of a polling interval determining database according to a second exemplary embodiment;

FIGS. 9A and 9B are diagrams illustrating an example of the polling interval determining database according to the second exemplary embodiment;

FIG. 12 is a diagram illustrating a modification of the polling interval determining database shown in FIG. 9A.

DETAILED DESCRIPTION

Figure 2A:
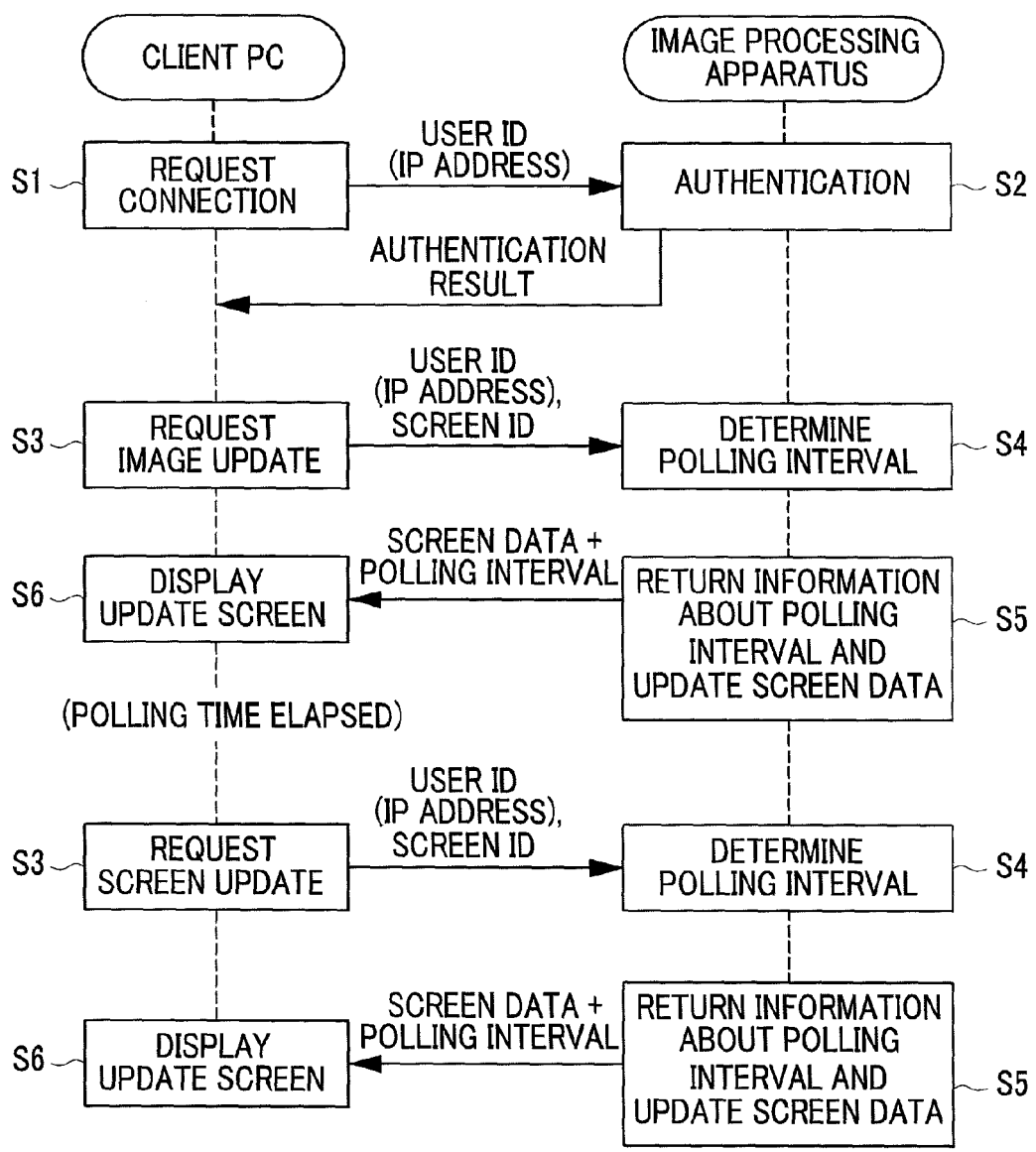
FIG. 2A is a sequence diagram illustrating a process of updating a screen displayed on a client PC 2A or 2B.

Hereinafter, exemplary embodiments of the invention will be described with reference to the accompanying drawings.

First Exemplary Embodiment

FIG. 1 is a block diagram illustrating the structure of a system including an external apparatus and an image processing apparatus according to a first exemplary embodiment.

In FIG. 1, an image processing apparatus 1 is, for example, a printer, a copier, or a multi-function machine. The image processing apparatus 1 includes a communication control unit 11, an input operating unit 12, an image reading unit 13, an image processing unit 14, an image output unit 15, a CPU (Central Processing Unit) 16, a ROM (Read Only Memory) 17, a RAM (Random Access Memory) 18, and a hard disk drive (HDD) 19. The CPU 16 functions as a receiving unit, a determining unit, a transmitting unit, and a calculating unit. The communication control unit 11 is connected to the input operating unit 12, the image reading unit 13, the image processing unit 14, the image output unit 15, the CPU 16, the ROM 17, the RAM 18, and the hard disk drive (HDD) 19 through a bus 10. The communication control unit 11 controls communication with a client PC 2A or 2B. The input operating unit 12 is a liquid crystal display unit with a touch panel and displays various statuses of the image processing apparatus 1 or is used to select functions. The image reading unit 13 is a scanner and reads images. The image processing unit 14 performs various kinds of image processing on an image to be printed. The image output unit 15 outputs an image onto a sheet. The CPU 16 controls the operation of each component of the image processing apparatus 1. The ROM 17 stores programs for controlling the image processing apparatus 1. The RAM 18 functions as a working memory. The HDD 19 stores a user authenticating database (DB) 19A, a polling interval determining database (DB) 19B, and various kinds of data.

Each of the client PCs 2A and 2B includes a control unit 20 that controls the overall operation of the apparatus, a display unit 21 that displays a browser, an input operating unit 22 that inputs an operation instruction to the client PC 2A or 2B, and a communication control unit 23 that controls communication with the image processing apparatus 1. The display unit 21 may be provided outside the client PC 2A or 2B and may be connected to the control unit 20. The browser displayed on the display unit 21 shows, for example, the setting information of the image processing apparatus 1 or the status of the image processing apparatus 1. The client PCs 2A and 2B are connected to the image processing apparatus 1 through a network 3.

FIG. 2A is a sequence diagram illustrating a process of updating the screen displayed on the client PC 2A or 2B. FIG. 2B is a sequence diagram illustrating a process related to the execution of a job. The job is, for example, the unit of a copy, print, or facsimile process.

The screen update process shown in FIG. 2A is performed regardless of whether a job is executed. Therefore, the screen update process shown in FIG. 2A is performed at the same time as the process related to the execution of a job shown in FIG. 2B is performed.

In FIG. 2A, when a connection request is input from the input operating unit 22, the control unit 20 of the client PC 2A or 2B outputs the connection request to the image processing apparatus 1 (Step S1). The connection request includes the IP address of the client PC 2A or 2B or a user ID. The CPU of the image processing apparatus 1 performs user authentication using the IP address or the user ID included in the connection request (Step S2). The CPU 16 performs user authentication using the user authenticating database 19A and the connection request. Then, the CPU 16 notifies the authentication result to the client PC 2A or 2B. It is assumed that the user authentication succeeds.

Then, the control unit 20 of the client PC 2A or 2B outputs a request to update the screen displayed on the display unit 21 to the image processing apparatus 1 (Step S3). The screen update request includes a screen ID for identifying the screen to be updated and the IP address of the client PC 2A or 2B or the user ID. In this way, the image processing apparatus 1 specifies the kind of screen to be updated and the output destination of screen data.

The CPU 16 of the image processing apparatus 1 receives the screen update request, searches the polling interval determining database 19B stored in the HDD 19 on the basis of the screen ID included in the screen update request, and determines a polling interval (Step S4). The CPU 16 incorporates the information of the determined polling interval into update screen data using an html tag or JavaScript and returns the update screen data to the client PC 2A or 2B corresponding to the received IP address or user ID (Step S5). The display unit 21 of the client PC 2A or 2B receives the update screen data and displays it (Step S6).

Since the polling interval is included in the update screen data received by the client PC 2A or 2B, Steps S3 to S6 are repeatedly performed whenever the polling time elapses.

In FIG. 2B, Steps S1 and S2 are performed, similarly to FIG. 2A. It is assumed that user authentication in Step S2 succeeds.

Then, when a job start request is input from the input operating unit 22, the control unit 20 of the client PC 2A or 2B outputs the job start request to the image processing apparatus 1 (Step S1). The job start request includes a job ID for identifying a job to be started and a user ID or the IP address of the client PC 2A or 2B. In this way, the image processing apparatus 1 specifies the kind of job to be started and the output destination of the start request.

The CPU 16 of the image processing apparatus 1 receives the job start request and performs a job corresponding to the job ID in the job start request (Step S8). In addition, the CPU 16 calculates an estimated job end time (Step S9). A method of calculating the estimated job end time is determined by the content of the job and the specifications of the image processing apparatus 1. For example, when a job is the color printing of about 100 pages and the image processing apparatus 1 is capable of printing about 20 pages per minute in the color print mode, the estimated job end time is about 5 minutes. For example, when a job is the reading of about 100 pages of a document and the image processing apparatus 1 is capable of reading about 25 pages per minute, the estimated job end time is about 4 minutes.

The CPU 16 searches the polling interval determining database 19B stored in the HDD 19 on the basis of the screen ID and the job ID, changes the polling interval, incorporates the information of the changed polling interval into update screen data, and transmits the update screen data to the client PC 2A or 2B (Step S10). The display unit 21 of the client PC 2A or 2B receives the update screen data, displays it, and outputs a screen update request to the image processing apparatus 1 on the basis of the information of the received polling interval (Step S11). When the job ends (Step S12), the CPU 16 returns the polling interval to a reference value (Step S13). The reference value of the polling interval is, for example, about 120 seconds.

FIGS. 3A and 3B are diagrams illustrating an example of the polling interval determining database 19B stored in the HDD 19. FIG. 3A shows the relationship between the attributes of a screen, the kind of screen, a screen ID, and a polling interval. FIG. 3B shows the relationship between the kind of job, the kind of screen, and the polling interval.

As shown in FIG. 3A, the screens displayed on the display unit 21 of the client PC 2A or 2B are classified into three attributes, that is, a "job status/setting screen", a "screen indirectly related to a job", and a "screen that is not related to a job". The kind of specific screen is associated with each attribute. For example, a job setting screen, a job list screen, a job history list screen, and an error history information screen are associated with the attribute "job status/setting screen". An apparatus status information screen, a supply status information screen, a tray status information screen, a counter information screen, and a confidential box document list screen are associated with the attribute "screen indirectly related to a job". For example, a support screen and a help screen are associated with the attribute "screen that is not related to a job". In addition, a unique screen ID and a unique polling interval are associated with each kind of screen.

Figure 4A:
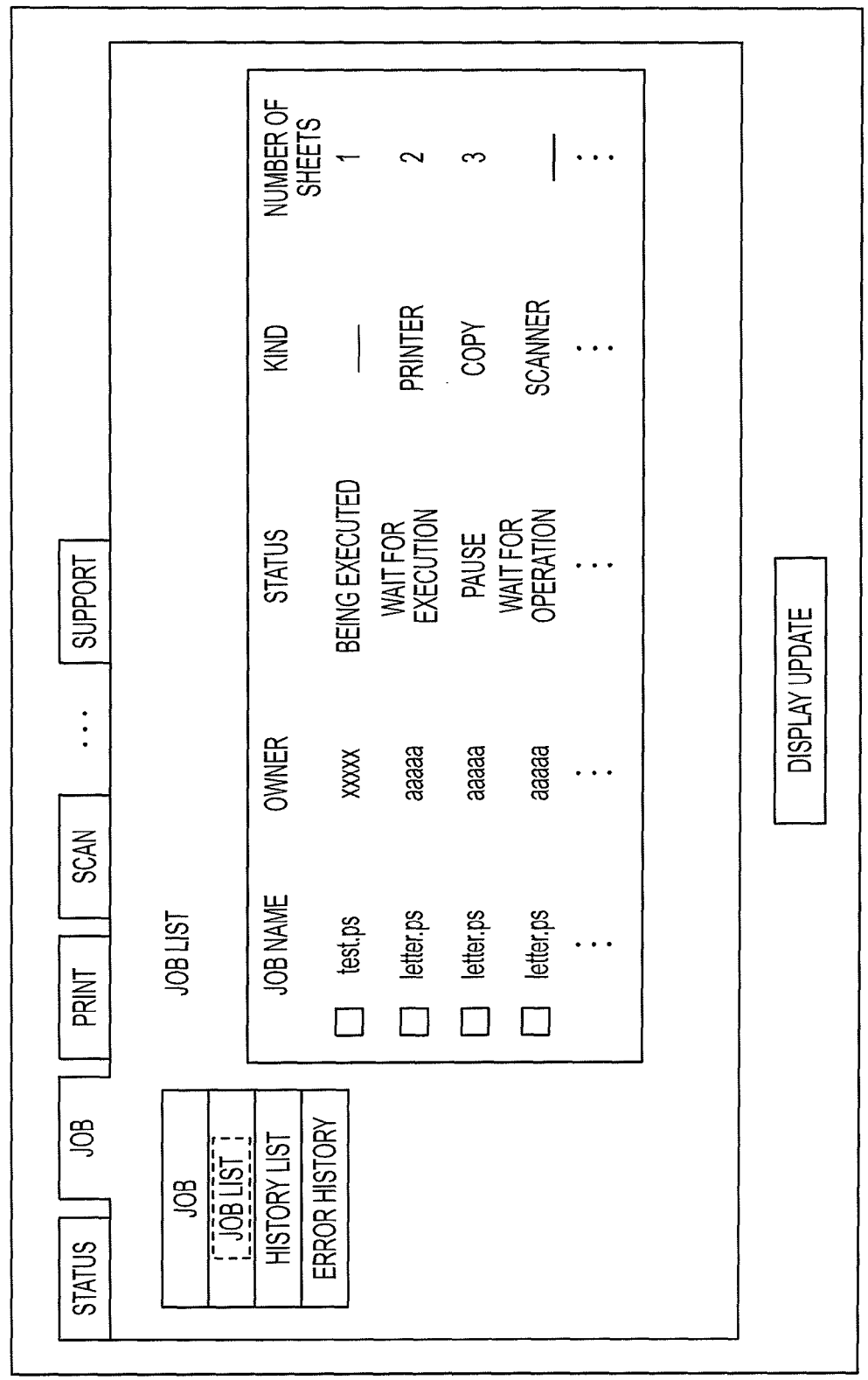
FIG. 4A is a diagram illustrating an example of a job list screen.

FIG. 3B shows a specific polling interval determined on the basis of the job ID and the screen ID. For example, when there is no job (job ID=J001), the polling interval of all of the screens is set to a reference value of about 120 seconds. When the job is a scan-to-facsimile job, a scan-to-confidential box job, a facsimile-to-print job, or a copy job, the polling interval of the job list screen is set to a value (about 10 seconds) less than the reference value. The reason is as follows: when a screen update interval is long, there is a concern that the information of the job will be omitted. An example of the job list screen is shown in FIG. 4A.

Figure 6A:
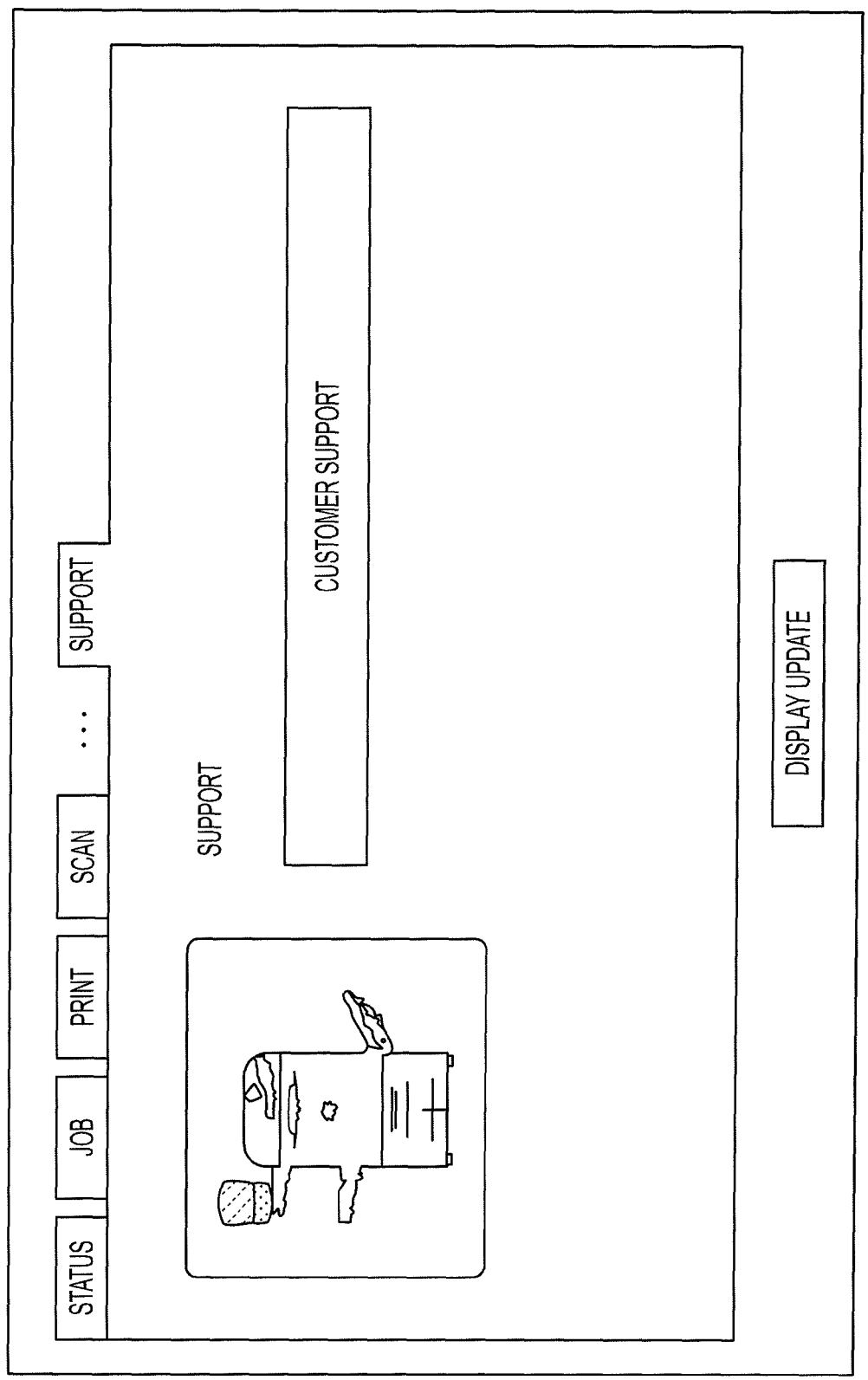
FIG. 6A is a diagram illustrating an example of a support screen.

When the job is a scan-to-facsimile job, a scan-to-confidential box job, a facsimile-to-print job, or a copy job, the polling interval of the support screen is set to a value (about 180 seconds) more than the reference value in order to prevent an unnecessary load from being applied to the image processing apparatus 1 during the execution of the job. An example of the support screen is shown in FIG. 6A.

When the job is a scan-to-facsimile job or a scan-to-confidential box job, the polling interval of the supply status information screen is set to a value (about 100 seconds) less than the reference value. Since the scan-to-facsimile job and the scan-to-confidential box job are not related to supplies, such as toner, the polling interval is not set to a very small value in order to reduce the load applied to the image processing apparatus 1. An example of the supply status information screen is shown in FIG. 4B.

When the job is a facsimile-to-print job or a copy job, the polling interval of the supply status information screen is set to a value (about 30 seconds) less than the reference value (about 120 seconds). Since the facsimile-to-print job or the copy job is related to supplies, the polling interval is set to a value less than the reference value in order to frequently notify the status of supplies to the user. The polling interval in the facsimile-to-print job or the copy job is less than that in the scan-to-facsimile job or the scan-to-confidential box job. This is because the polling interval is determined by the degree of association between the job and the screen, as described above.

Figure 5A:
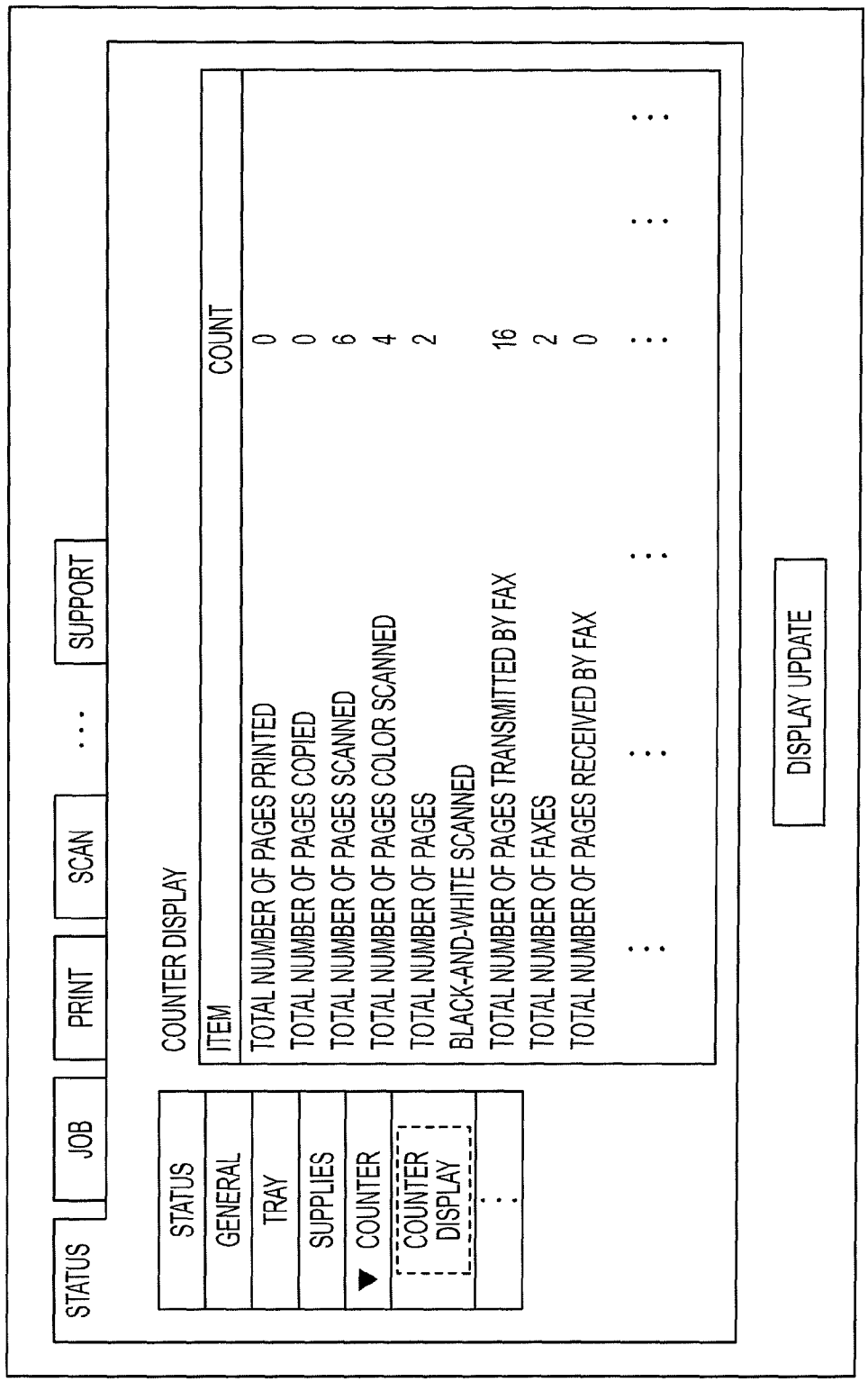
FIG. 5A is a diagram illustrating an example of a counter information screen.

When the job is a scan-to-facsimile job, a scan-to-confidential box job, a facsimile-to-print job, or a copy job, the polling interval of the counter information screen is set to a value (about 30 seconds) less than the reference value (about 120 seconds). Since the scan-to-facsimile job, the scan-to-confidential box job, the facsimile-to-print job, or the copy job is related to counting information, such as the number of scanning operations or the number of copies, the polling interval is set to a value less than the reference value in order to frequently notify the counting information to the user. An example of the counter information screen is shown in FIG. 5A.

Figure 5B:
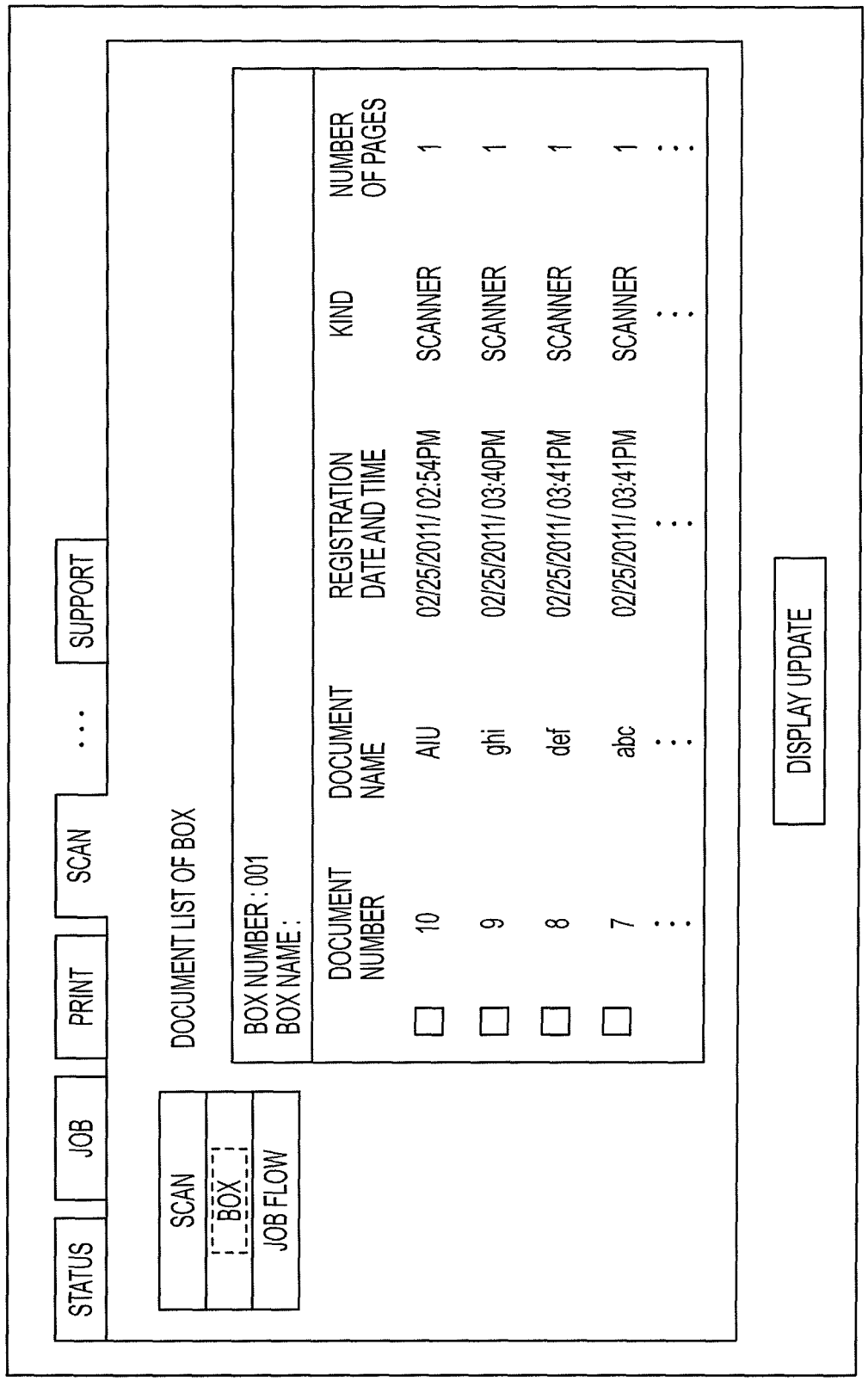
FIG. 5B is a diagram illustrating an example of a confidential box document list screen.

When the job is a scan-to-facsimile job, a facsimile-to-print job, or a copy job, the polling interval of the confidential box document list screen is set to a value (about 100 seconds) less than the reference value. Since the scan-to-facsimile job, the facsimile-to-print job, or the copy job is not related to the confidential box, the polling interval is not set to a very small value in order to reduce the load applied to the image processing apparatus 1. An example of the confidential box document list screen is shown in FIG. 5B. When the job is a scan-to-confidential box job, the polling interval of the confidential box document list screen is set to a value (about 10 seconds) less than the reference value (about 120 seconds). Since the scan-to-confidential box job is related to a document list in the confidential box, the polling interval in the scan-to-confidential box job is set to a value less than the reference value in order to frequently notify the status of the confidential box to the user.

The polling interval in the scan-to-confidential box job is less than that in the scan-to-facsimile job, the facsimile-to-print job, or the copy job. This is because the polling interval is determined by the degree of association between the job and the screen, as described above.

For example, in the case of the scan-to-facsimile job, the support screen has the longest polling interval, followed by the supply status information screen, the confidential box document list screen, the counter information screen, and the job list screen in this order. As such, as the degree of association with the job increases, the polling interval is reduced.

Figure 6B:
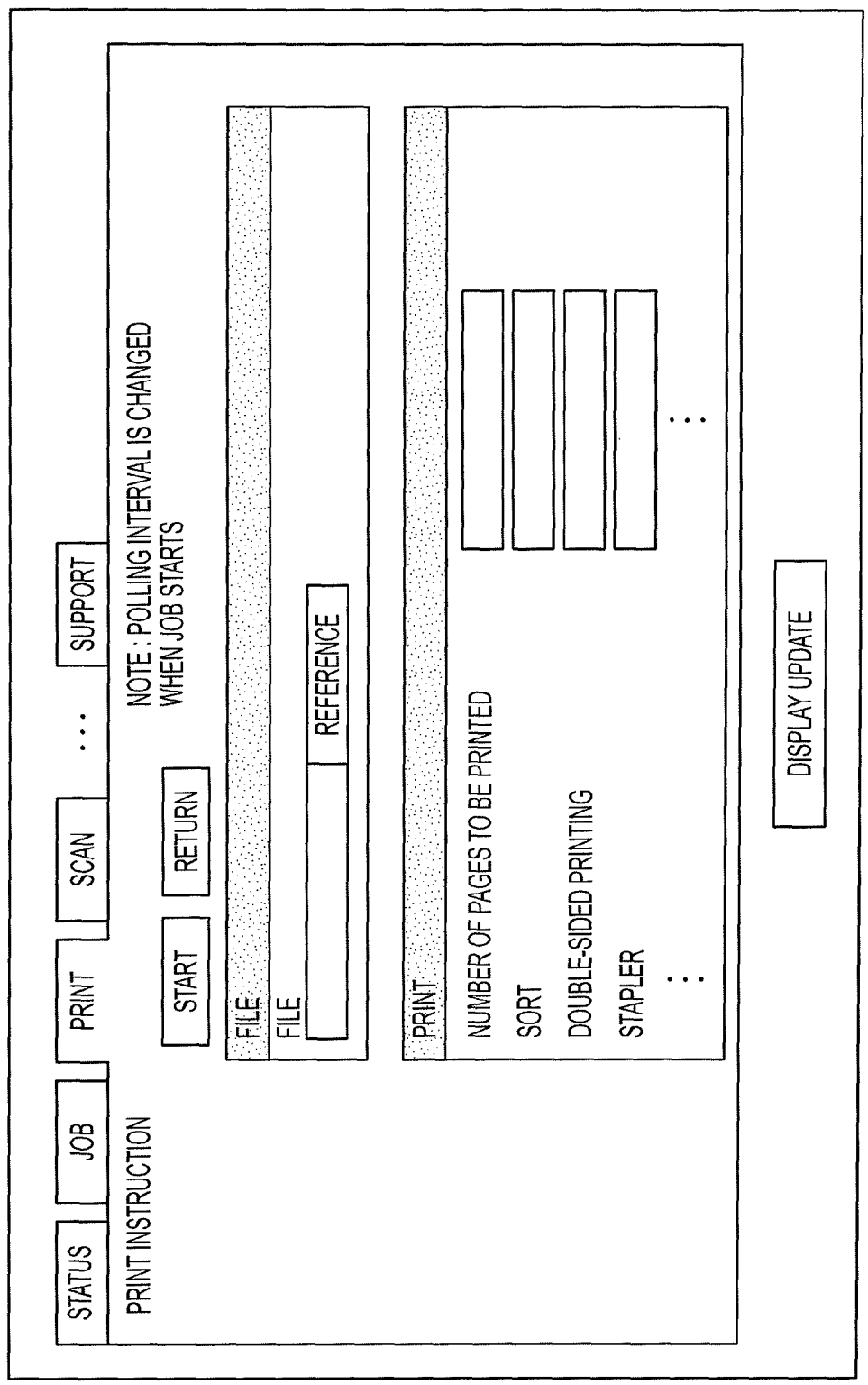
FIG. 6B is a diagram illustrating an example of a job setting screen.

FIG. 6B shows an example of the job setting screen. Information indicating that the polling interval is changed when a job starts is displayed on the job setting screen. That is, when a job is set, a message "please note that the polling interval will change when the job starts" is displayed on the job setting screen. When the job starts, a message "the polling interval is short" or a message "the polling interval is long" is displayed on the job setting screen. By means of this display, the user's attention is called to a change in the polling interval.

FIG. 7 is a flowchart illustrating the details of a process (Step S10 in FIG. 2B) of changing the polling interval while the image processing apparatus 1 performs a job. It is assumed that the user of the client PC 2A or 2B is authenticated by the image processing apparatus 1 and the CPU 16 of the image processing apparatus 1 acquires a user ID (or an IP address), a screen ID, and a job ID, as described with reference to FIGS. 2A and 2B.

First, the CPU 16 of the image processing apparatus 1 determines whether the screen displayed on the display unit 21 of the client PC 2A or 2B is related to a job on the basis of the screen ID and the job ID acquired from the client PC 2A or 2B and the polling interval determining database shown in FIGS. 3A and 3B (Step S21). The term "screen related to a job" is a screen belonging to the attributes "job status/setting screen" and the "screen indirectly related to a job".

When the determination result in Step S21 is "NO", the CPU 16 changes the current polling interval to a value more than the reference value on the basis of the polling interval determining database shown in FIG. 3B (Step S22). In this case, in the example shown in FIG. 3B, polling is stopped until the estimated job end time. However, the CPU 16 may set the polling interval to a value (for example, 180 seconds) more than the reference value.

When the determination result in Step S21 is "YES", the CPU 16 determines whether the screen displayed on the display unit 21 of the client PC 2A or 2B belongs to the attribute "job status/setting screen" on the basis of the screen ID and the job ID acquired from the client PC 2A or 2B and the polling interval determining database shown in FIGS. 3A and 3B (Step S23).

When the determination result in Step S23 is "YES", the CPU 16 changes the current polling interval to a value less than the reference value on the basis of the polling interval determining database shown in FIG. 3B (Step S24). In the example shown in FIG. 3B, the polling interval is set to about 10 seconds, but the invention is not limited thereto. The polling interval may be less than the reference value. When the determination result in Step S23 is "NO", the CPU 16 changes the current polling interval to a value that is less than the reference value and corresponds to the degree of association between the job and the screen, on the basis of the polling interval determining database shown in FIG. 3B (Step S25).

As described above, according to the first exemplary embodiment, the image processing apparatus 1 includes the polling interval determining database 19B that defines the relationship between the screen ID, the job ID, and the polling interval corresponding to the degree of association between the screen and the job and the CPU 16 that determines the polling interval corresponding to the degree of association between the job and the screen on the basis of the screen ID and the job ID received from the client PC 2A or 2B and the polling interval determining database 19B. The CPU 16 incorporates the information of the determined polling interval into screen data and transmits the screen data to the client PC 2A or 2B that outputs the screen update request. Therefore, it is possible to adjust the load applied from the client PC 2A or 2B on the basis of the content of the screen displayed on the client PC 2A or 2B and the content of the job that is being processed.

Second Exemplary Embodiment

A second exemplary embodiment differs from the first exemplary embodiment in the structure of the polling interval determining database 19B and a process of changing the polling interval. The structure of a system including an image processing apparatus according to the second exemplary embodiment is the same as that of the system including the image processing apparatus according to the first exemplary embodiment. In the second exemplary embodiment, the screen update process shown in FIG. 2A and the process related to a job shown in FIG. 2B are also performed.

FIG. 8 and FIGS. 9A and 9B are diagrams illustrating an example of a polling interval determining database 19B according to the second exemplary embodiment.

FIG. 8 shows the relationship between the attributes of a screen, the kind of screen, a screen ID, a job requester, and a polling interval. FIG. 9A shows the relationship between the kind of job, the kind of screen, and the polling interval when a job requester is the user (that is, the user itself). FIG. 9B shows the relationship between the kind of job, the kind of screen, and the polling interval when the job requester is another user.

As shown in FIG. 8, the screens displayed on the display unit 21 of the client PC 2A or 2B are classified into three attributes, that is, a "job status/setting screen", a "screen indirectly related to a job", and a "screen that is not related to a job". The kind of specific screen is associated with each attribute. For example, a job setting screen, a job list screen, a job history list screen, and an error history information screen are associated with the attribute "job status/setting screen". An apparatus status information screen, a supply status information screen, a tray status information screen, a counter information screen, and a confidential box document list screen are associated with the attribute "screen indirectly related to a job". A support screen and a help screen are associated with the attribute "screen that is not related to a job". In addition, a unique screen ID is associated with each kind of screen. A polling interval is associated with the attributes of the screen. The polling interval is associated with the job requester. The polling interval is changed on the basis of whether the job requester is the user or another user.

When the job requester is the user (that is, the user personally), the polling interval determining database shown in FIG. 9A is used together with the polling interval determining database shown in FIG. 8.

FIG. 9A shows a specific polling interval determined on the basis of the job ID and the screen ID. For example, when there is no job (job ID=J001), the polling interval of all of the screens is set to about 120 seconds, which are a reference value. When the job is a scan-to-facsimile job, a scan-to-confidential box job, a facsimile-to-print job, or a copy job, the polling interval of the job list screen (see FIG. 4A) is set to a value (about 10 seconds) less than the reference value. The reason is as follows: when a screen update interval is long, there is a concern that the job information will be omitted.

When the job is a scan-to-facsimile job, a scan-to-confidential box job, a facsimile-to-print job, or a copy job, the polling of the support screen (see FIG. 6A) is stopped until the estimated job end time in order to prevent an unnecessary load from being applied to the image processing apparatus 1 during the execution of the job.

When the job is a scan-to-facsimile job or a scan-to-confidential box job, the polling of the supply status information screen (see FIG. 4B) is stopped until the estimated job end time. Since the scan-to-facsimile job and the scan-to-confidential box job are not related to supplies, such as toner, polling is stopped until the estimated job end time in order to reduce the load applied to the image processing apparatus 1. When the job is a facsimile-to-print job or a copy job, the polling interval of the supply status information screen is set to the time (about 30 seconds) less than the reference value (about 120 seconds). Since the facsimile-to-print job or the copy job is related to supplies, the polling interval is set to a value less than the reference value in order to frequently notify the status of supplies to the user.

When the job is a scan-to-facsimile job, a scan-to-confidential box job, a facsimile-to-print job, or a copy job, the polling interval of the counter information screen (see FIG. 5A) is set to a value (about 30 seconds) less than the reference value (about 120 seconds). Since the scan-to-facsimile job, the scan-to-confidential box job, the facsimile-to-print job, or the copy job is related to counting information, such as the number of scanning operations or the number of copies, the polling interval is set to a value less than the reference value in order to frequently notify the counting information to the user.

When the job is a scan-to-facsimile job, a facsimile-to-print job, or a copy job, the polling of the confidential box document list screen (see FIG. 5B) is stopped until the estimated job end time. Since the scan-to-facsimile job, the facsimile-to-print job, or the copy job is not related to the confidential box, polling is stopped until the estimated job end time in order to reduce the load applied to the image processing apparatus 1. When the job is a scan-to-confidential box job, the polling interval of the confidential box document list screen is set to a value (about 10 seconds) less than the reference value (about 120 seconds). Since the scan-to-confidential box job is related to a document list in the confidential box, the polling interval is set to a value less than the reference value in order to frequently notify the status of the confidential box to the user.

As such, the polling interval is determined on the basis of the degree of association between the job and the screen.

When the job requester is another user, the polling interval determining database shown in FIG. 9B is used together with the polling interval determining database shown in FIG. 8.

FIG. 9B shows a specific polling interval determined on the basis of the job ID and the screen ID. For example, when there is no job (job ID=J001), the polling interval of all of the screens is set to a reference value of about 120 seconds. When the job is a scan-to-facsimile job, a scan-to-confidential box job, a facsimile-to-print job, or a copy job, the polling interval of the job list screen (see FIG. 4A) is stopped until the estimated job end time. This is because the user does not generally need to check the status of the job of another user. In this way, it is possible to prevent an unnecessary load from being applied to the image processing apparatus 1.

When the job is a scan-to-facsimile job, a scan-to-confidential box job, a facsimile-to-print job, or a copy job, the polling of the support screen (see FIG. 6A) is stopped until the estimated job end time in order to prevent an unnecessary load from being applied to the image processing apparatus 1 during the execution of the job.

When the job is a scan-to-facsimile job or a scan-to-confidential box job, the polling of the supply status information screen (see FIG. 4B) is stopped until the estimated job end time. Since the scan-to-facsimile job and the scan-to-confidential box job are not related to supplies, such as toner, polling is stopped until the estimated job end time in order to reduce the load applied to the image processing apparatus 1. When the job is a facsimile-to-print job or a copy job, the polling interval of the supply status information screen is set to the reference value (about 120 seconds). Since the facsimile-to-print job or the copy job is related to supplies, but is of another user, it is not necessary to frequently notify the status of supplies to the user. Therefore, the polling interval is set to the reference value.

When the job is a scan-to-facsimile job, a scan-to-confidential box job, a facsimile-to-print job, or a copy job, the polling interval of the counter information screen (see FIG. 5A) is set to the reference value (about 120 seconds). Since the scan-to-facsimile job, the scan-to-confidential box job, the facsimile-to-print job, or the copy job is related to counting information, such as the number of scanning operations or the number of copies, but is of another user, it is not necessary to frequently notify the counting information to the user. Therefore, the polling interval is set to the reference value.

When the job is a scan-to-facsimile job, a facsimile-to-print job, or a copy job, the polling of the confidential box document list screen (see FIG. 5B) is stopped until the estimated job end time. Since the scan-to-facsimile job, the facsimile-to-print job, or the copy job is not related to the confidential box, polling is stopped until the estimated job end time in order to reduce the load applied to the image processing apparatus 1. When the job is a scan-to-confidential box job, the polling interval of the confidential box document list screen is set to a value (about 10 seconds) less than the reference value (about 120 seconds). The scan-to-confidential box job is related to a document list in the confidential box, and in some cases, a document is provided from another user to the user. Therefore, the polling interval is set to a value less than the reference value in order to frequently notify the status of the confidential box to the user.

As such, the polling interval is determined on the basis of the degree of association between the job and the screen.

Figure 10:
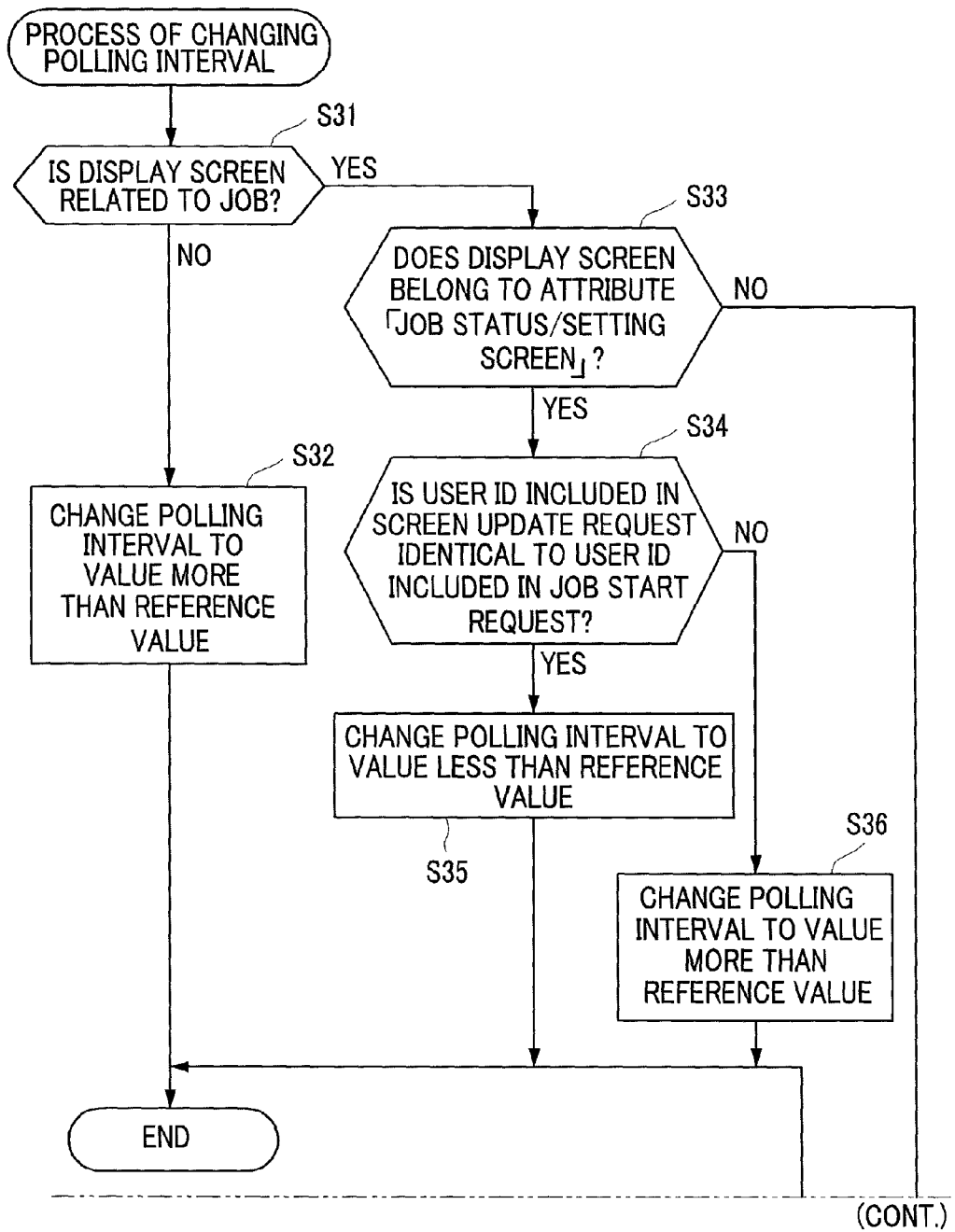
FIG. 10 is a flowchart illustrating the details of a process (Step S10 in FIG. 2B) of changing a polling interval while an image processing apparatus performs a job.

FIG. 10 is a flowchart illustrating the details of a process (Step S10 in FIG. 2B) of changing the polling interval while the image processing apparatus 1 performs a job. It is assumed that the user of the client PC 2A or 2B is authenticated by the image processing apparatus 1 and the CPU 16 of the image processing apparatus 1 acquires a user ID (or an IP address), a screen ID, and a job ID, as described with reference to FIGS. 2A and 2B.

First, the CPU 16 of the image processing apparatus 1 determines whether the screen displayed on the display unit 21 of the client PC 2A or 2B is related to a job on the basis of the screen ID and the job ID acquired from the client PC 2A or 2B and the polling interval determining database shown in FIG. 8 and FIGS. 9A and 9B (Step S31). The term "screen related to a job" is a screen belonging to the attributes "job status/setting screen" and "screen indirectly related to a job".

When the determination result in Step S31 is "NO", the CPU 16 changes the current polling interval to be more than the reference value on the basis of the polling interval determining database shown in FIGS. 9A and 9B (Step S32). In this case, in the example shown in FIGS. 9A and 9B, polling is stopped until the estimated job end time. However, the CPU 16 may set the polling interval to a value (for example, about 180 seconds) more than the reference value.

When the determination result in Step S31 is "YES", the CPU 16 determines whether the screen displayed on the display unit 21 of the client PC 2A or 2B belongs to the attribute "job status/setting screen" on the basis of the screen ID acquired from the client PC 2A or 2B and the polling interval determining database shown in FIG. 8 (Step S33).

When the determination result in Step S33 is "YES", the CPU 16 determines whether the user ID included in a screen update request is identical to the user ID included in a job start request (Step S34). The CPU 16 determines whether the job requester is the user or another user.

When the determination result in Step S34 is "YES" (that is, when the job requester is the user), the CPU 16 changes the current polling interval to a value less than the reference value on the basis of the polling interval determining database shown in FIG. 9A (Step S35). In the example shown in FIG. 9A, the polling interval is set to about 10 seconds, but the invention is not limited thereto. The polling interval may be less than the reference value.

When the determination result in Step S34 is "NO" (that is, when the job requester is another user), the CPU 16 changes the current polling interval to a value more than the reference value on the basis of the polling interval determining database shown in FIG. 9B (Step S36). In this case, in the example shown in FIG. 9B, polling is stopped until the estimated job end time. However, the CPU 16 may set the polling interval to a value (for example, about 180 seconds) more than the reference value.

When the determination result in Step S33 is "NO", the CPU 16 determines whether the user ID included in the screen update request is identical to the user ID included in the job start request (Step S37). The CPU 16 determines whether the job requester is the user or another user.

When the determination result in Step S37 is "YES" (that is, when the job requester is the user), the CPU 16 changes the current polling interval to a value corresponding to the degree of association between the job and the screen on the basis of the polling interval determining database shown in FIG. 9A (Step S38). In this case, when the screen with a high degree of association with the job is displayed on the display unit 21 (that is, when the job ID is J004 or J005 and the screen ID is B002, when the job ID is J002, J003, J004, or J005 and the screen ID is B004, or when the job ID is J003 and the screen ID is B005 in FIG. 9A), the polling interval is less than the reference value. When the screen with a low degree of association with the job is displayed on the display unit 21 (that is, when the job ID is J002 or J003 and the screen ID is B002, or when the job ID is J002, J004, or J005 and the screen ID is B005 in FIG. 9A), polling is stopped until the estimated job end time or the polling interval is more than the reference value.

When the determination result in Step S37 is "NO" (that is, when the job requester is another user), the CPU 16 changes the current polling interval to a value corresponding to the degree of association between the job and the screen on the basis of the polling interval determining database shown in FIG. 9B (Step S39). In this case, when the screen with a high degree of association with the job is displayed on the display unit 21 and no information is provided to the user (that is, when the job ID is J004 or J005 and the screen ID is B002 or when the job ID is J002, J003, J004, or J005 and the screen ID is B004 in FIG. 9B), the polling interval is the reference value. When the screen with a high degree of association with the job is displayed on the display unit 21 and information is provided to the user (that is, when the job ID is J003 and the screen ID is B005 in FIG. 9B), the polling interval is less than the reference value. When the screen with a low degree of association with the job is displayed on the display unit 21 (that is, when the job ID is J002 or J003 and the screen ID is B002 or when the job ID is J002, J004, or J005 and the screen ID is B005 in FIG. 9B), polling is stopped until the estimated job end time or the polling interval is more than the reference value.

As described above, according to the second exemplary embodiment, it is possible to adjust the load from the client PC 2A or 2B according to the degree of association between the screen and the job regardless of whether the user who requests the update of the screen is identical to or different from the user who requests the start of the job.

Third Exemplary Embodiment

A third exemplary embodiment differs from the first and second exemplary embodiments in that the CPU 16 calculates the estimated job end time when the polling interval is changed. The structure of a system including an image processing apparatus according to the third exemplary embodiment is the same as that of the system including the image processing apparatus according to the first exemplary embodiment. In the third exemplary embodiment, the CPU 16 uses the polling interval determining database shown in FIG. 8 and FIGS. 9A and 9B.

In the third exemplary embodiment, the screen update process shown in FIG. 2A and some steps (Steps S1, S2, S7, S8, and S11) of the process related to the execution of a job shown in FIG. 2B are performed. The other steps (Steps S9, S10, S12, and S13) of the process related to the execution of a job shown in FIG. 2B are replaced with a process of changing the polling interval shown in FIG. 11, which will be described below. After Step S8 in FIG. 2, the process of changing the polling interval shown in FIG. 11 is performed.

Figure 11:
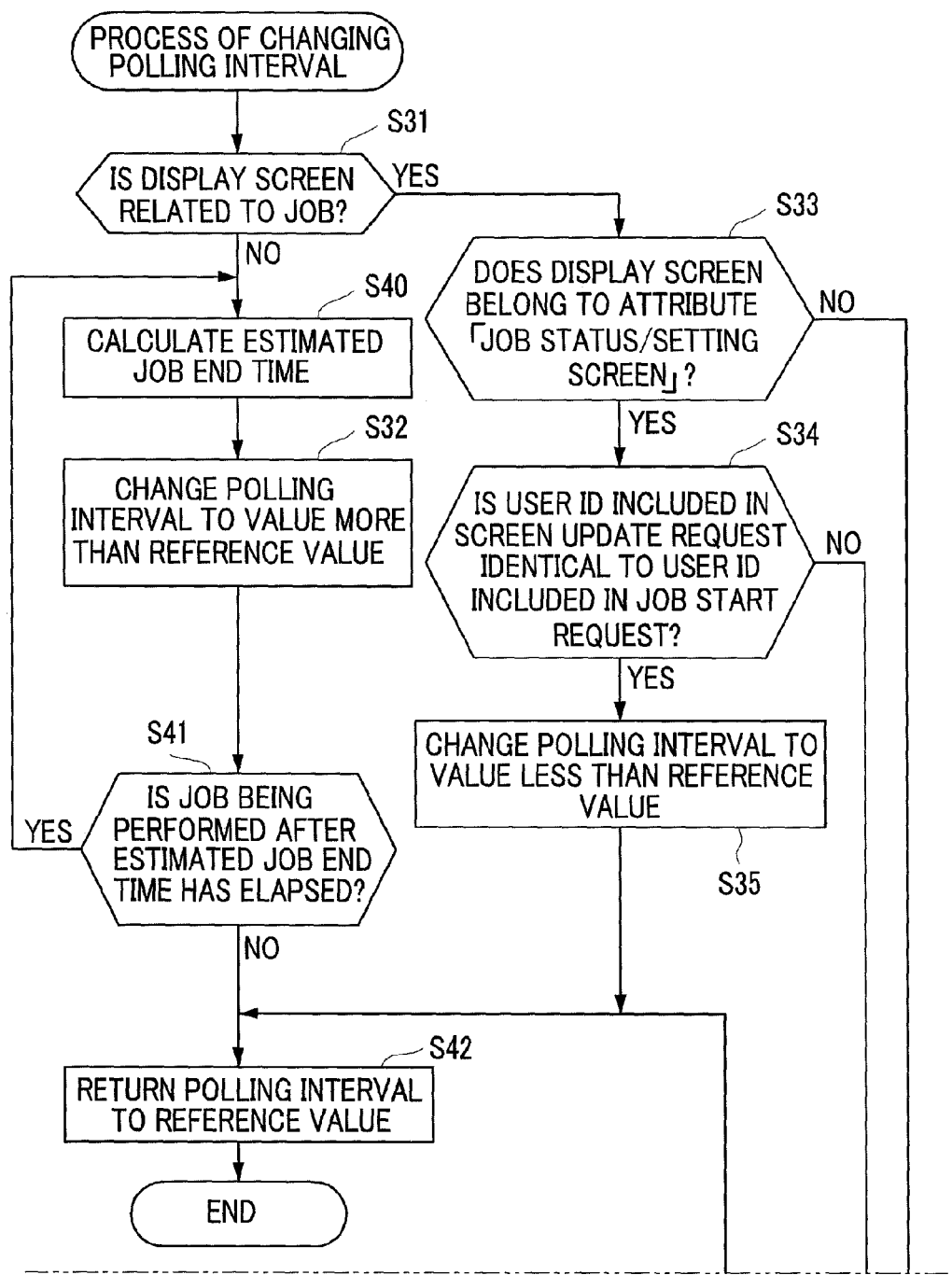
FIG. 11 is a flowchart illustrating a process of changing a polling interval while an image processing apparatus according to a third exemplary embodiment performs a job.

FIG. 11 is a flowchart illustrating a process of changing the polling interval while the image processing apparatus 1 according to the third exemplary embodiment performs a job. It is assumed that the user of the client PC 2A or 2B is authenticated by the image processing apparatus 1 and the CPU 16 of the image processing apparatus 1 acquires a user ID (or an IP address), a screen ID, and a job ID.

There is a difference between the process of changing the polling interval shown in FIG. 11 and the process of changing the polling interval shown in FIG. 10 and the difference will be described below.

When the determination result in Step S31 is "NO", the CPU 16 calculates the estimated job end time (Step S40). After Step S32, the CPU 16 determines whether the job is continuously performed after the estimated job end time has elapsed (Step S41). When the determination result in Step S41 is "NO", the CPU 16 returns the polling interval to the reference value (Step S42) and ends the process. When the determination result in Step S41 is "YES", the CPU 16 recalculates the estimated job end time in Step S40. The reason why the estimated job end time is recalculated is that, in some cases, polling is stopped until the estimated job end time in Step S32.

A method of calculating the estimated job end time and a method of recalculating the estimated job end time are determined by the content of the job and the specifications of the image processing apparatus 1. For example, when the job is the printing of about 100 pages in the color print mode and the image processing apparatus 1 is capable of printing about 20 pages per minute in the color print mode, the estimated job end time is about 5 minutes. When the job is the reading of about 100 pages of a document and the image processing apparatus 1 is capable of reading about 25 pages per minute, the estimated job end time is about 4 minutes.

When the determination result in Step S34 is "NO", the CPU 16 calculates the estimated job end time (Step S43). After Step S36, the CPU 16 determines whether the job is continuously performed after the estimated job end time has elapsed (Step S44). When the determination result in Step S44 is "NO", the process proceeds to Step S42. When the determination result in Step S44 is "YES", the CPU 16 recalculates the estimated job end time in Step S43. The reason why the estimated job end time is recalculated is that, in some cases, polling is stopped until the estimated job end time in Step S36.

In Step S35, the CPU 16 changes the current polling interval to a value less than the reference value. The CPU 16 may take into account a case in which the user wants to update the screen early as the change condition of Step S35. In Step S36, the CPU 16 changes the current polling interval to a value more than the reference value. The CPU 16 may take into account a case in which the user does not want to update the screen early as the change condition of Step S36.

When the determination result in Step S37 is "YES", the CPU 16 calculates the estimated job end time (Step S45). After Step S38, the CPU 16 determines whether the job is continuously performed after the estimated job end time has elapsed (Step S46). When the determination result in Step S46 is "NO", the process proceeds to Step S42. When the determination result in Step S46 is "YES", the CPU 16 recalculates the estimated job end time in Step S45. The reason why the estimated job end time is recalculated is that, in some cases, polling is stopped until the estimated job end time in Step S38.

When the determination result in Step S37 is "NO", the CPU 16 calculates the estimated job end time (Step S47). After Step S39, the CPU 16 determines whether the job is continuously performed after the estimated job end time has elapsed (Step S48). When the determination result in Step S48 is "NO", the process proceeds to Step S42. When the determination result in Step S48 is "YES", the CPU 16 recalculates the estimated job end time in Step S47. The reason why the estimated job end time is recalculated is that, in some cases, polling is stopped until the estimated job end time in Step S39.

When the job ends before the estimated job end time elapses, the CPU 16 may return the polling interval to the reference value at the time when the job ends.

When the determination result in Step S34 of FIG. 11 is "YES", the CPU 16 does not calculate the estimated job end time. This is because the CPU 16 changes the current polling interval to a predetermined value (about 10 seconds corresponding to the screen ID=A001) in the polling interval determining database shown in FIG. 9A.

In the third exemplary embodiment, for example, the polling interval determining database shown in FIG. 12 may be used as the polling interval determining database shown in FIG. 9A. In the polling interval determining database shown in FIG. 12 when the screen ID is A001, B002, or B004 and the job ID is J004 or J005, the polling interval is calculated on the basis of the estimated job end time and the content of the job (for example, the number of printouts and the number of copies).

For example, when the screen ID is A001 and the job ID is J004, the CPU 16 calculates the estimated job end time, calculates the polling interval using an expression (the estimated job end time/the number of printouts+1 second), and changes the current polling interval to the calculated polling interval. When the screen ID is B002 or B004 and the job ID is 004, the CPU 16 calculates the estimated job end time, calculates the polling interval using an expression (the estimated job end time/the number of printouts/2+1 seconds), and changes the current polling interval to the calculated polling interval. When the screen ID is A001 and the job ID is J005, the CPU 16 calculates the estimated job end time, calculates the polling interval using an expression (the estimated job end time/the number of copies+1 second), and changes the current polling interval to the calculated polling interval. When the screen ID is B002 or B004 and the job ID=005, the CPU 16 calculates the estimated job end time, calculates the polling interval using an expression (the estimated job end time/the number of copies/2+1 seconds), and changes the current polling interval to the calculated polling interval.

As such, the CPU 16 may calculate the polling interval on the basis of the estimated job end time and the content of the job. In this case, the load applied to the image processing apparatus 1 is adjusted on the basis of the estimated job end time and the content of the job. That is, it is possible to prevent an excessively large load from being applied to the image processing apparatus 1.

As described above, according to the third exemplary embodiment, when the polling of the screen is stopped until the estimated job end time, it is possible to stop the polling of the screen until the job ends.

A storage medium storing a software program for implementing the functions of the image processing apparatus 1 may be provided to the image processing apparatus 1 and the CPU 16 may read and execute the program stored in the storage medium. In this case, the same effect as that in the above-described exemplary embodiments is obtained. For example, there is a CD-ROM, a DVD, or an SD card as the storage medium for providing the program. The CPU 16 may execute the software program for implementing the functions of the image processing apparatus 1 to obtain the same effect as that in the above-described exemplary embodiments.

The invention is not limited to the above-described exemplary embodiments, but various kinds of modifications and changes of the invention may be made without departing from the scope and spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a receiving unit that receives a screen update request including identification information of a screen and a job start request including identification information of a job;
a database that defines a relationship between the identification information of the screen, the identification information of the job, and a polling interval corresponding to a degree of association between the screen and the job;
a determining unit that determines the polling interval corresponding to the degree of association between the screen and the job on the basis of the identification information of the screen and the identification information of the job received by the receiving unit and the database; and
a transmitting unit that incorporates information of the determined polling interval into screen data and transmits the incorporated screen data to an external apparatus that outputs the screen update request.

2. The image processing apparatus according to claim 1, wherein the polling interval defined in the database is reduced as the degree of association between the screen and the job increases.

3. The image processing apparatus according to claim 2, further comprising:
a calculating unit that calculates an estimated end time of the job on the basis of the content of the job and the specifications of the image processing apparatus,
wherein, when the screen is not related to the job, polling to the external apparatus that outputs the screen update request is stopped until the estimated job end time calculated by the calculating unit.

4. The image processing apparatus according to claim 3, wherein, when a user of the external apparatus that outputs the screen update request is different from a user of an external apparatus that outputs the job start request, a polling interval of a screen related to a job that provides information directly related to the user of the external apparatus which outputs the screen update request is set to a value less than a reference value of the polling interval, a polling interval of a screen related to a job other than the job that provides the information directly related to the user of the external apparatus which outputs the screen update request is set to the reference value of the polling interval, or polling of the screen related to the job other than the job that provides the information directly related to the user of the external apparatus which outputs the screen update request is stopped until the estimated job end time.

5. The image processing apparatus according to claim 4, wherein, when the job does not end after the estimated job end time has elapsed, the calculating unit recalculates the estimated job end time.

6. The image processing apparatus according to claim 3, wherein, when the user of the external apparatus that outputs the screen update request is identical to a user of an external apparatus that outputs the job start request, a polling interval of a screen that is related to the job is set to a value less than a reference value of the polling interval and polling of a screen that is not related to the job is stopped until the estimated job end time.

7. The image processing apparatus according to claim 6, wherein, when the job does not end after the estimated job end time has elapsed, the calculating unit recalculates the estimated job end time.

8. The image processing apparatus according to claim 3, wherein, when the job does not end after the estimated job end time has elapsed, the calculating unit recalculates the estimated job end time.

9. The image processing apparatus according to claim 3, wherein the determining unit changes a polling interval of a screen that is related to the job, on the basis of the estimated job end time and the content of the job.

10. The image processing apparatus according to claim 1, further comprising:
a calculating unit that calculates an estimated end time of the job on the basis of the content of the job and the specifications of the image processing apparatus,
wherein, when the screen is not related to the job, polling to the external apparatus that outputs the screen update request is stopped until the estimated job end time calculated by the calculating unit.

11. The image processing apparatus according to claim 10, wherein, when a user of the external apparatus that outputs the screen update request is different from a user of an external apparatus that outputs the job start request, a polling interval of a screen related to a job that provides information directly related to the user of the external apparatus which outputs the screen update request is set to a value less than a reference value of the polling interval, a polling interval of a screen related to a job other than the job that provides the information directly related to the user of the external apparatus which outputs the screen update request is set to the reference value of the polling interval, or polling of the screen related to the job other than the job that provides the information directly related to the user of the external apparatus which outputs the screen update request is stopped until the estimated job end time.

12. The image processing apparatus according to claim 11, wherein, when the job does not end after the estimated job end time has elapsed, the calculating unit recalculates the estimated job end time.

13. The image processing apparatus according to claim 10, wherein, when the user of the external apparatus that outputs the screen update request is identical to a user of an external apparatus that outputs the job start request, a polling interval of a screen that is related to the job is set to a value less than a reference value of the polling interval and polling of a screen that is not related to the job is stopped until the estimated job end time.

14. The image processing apparatus according to claim 13, wherein, when the job does not end after the estimated job end time has elapsed, the calculating unit recalculates the estimated job end time.

15. The image processing apparatus according to claim 10, wherein, when the job does not end after the estimated job end time has elapsed, the calculating unit recalculates the estimated job end time.

16. The image processing apparatus according to claim 10, wherein the determining unit changes a polling interval of a screen that is related to the job, on the basis of the estimated job end time and the content of the job.

17. An image processing method comprising:
receiving a screen update request including identification information of a screen and a job start request including identification information of a job;
storing a relationship between the identification information of the screen, the identification information of the job, and a polling interval corresponding to a degree of association between the screen and the job in a database;
determining the polling interval corresponding to the degree of association between the screen and the job on the basis of the received identification information of the screen, the received identification information of the job, and the database; and
incorporating information of the determined polling interval into screen data and transmitting the incorporated screen data to an external apparatus that outputs the screen update request.

18. A non-transitory computer readable medium storing a program that causes a computer to function as:
a receiving unit that receives a screen update request including identification information of a screen and a job start request including identification information of a job;
a database that defines a relationship between the identification information of the screen, the identification information of the job, and a polling interval corresponding to a degree of association between the screen and the job;
a determining unit that determines the polling interval corresponding to the degree of association between the screen and the job on the basis of the identification information of the screen and the identification information of the job received by the receiving unit and the database; and
a transmitting unit that incorporates information of the determined polling interval into screen data and transmits the incorporated screen data to an external apparatus that outputs the screen update request.

* * * * *